United States Patent [19]

Farr

[11] Patent Number: 4,543,976
[45] Date of Patent: Oct. 1, 1985

[54] CONTROL VALVES FOR VEHICLE HYDRAULIC SYSTEMS

[75] Inventor: Glyn P. R. Farr, Warwickshire, England

[73] Assignee: Lucas Industries Public Limited Company, Birmingham, England

[21] Appl. No.: 690,037

[22] Filed: Jan. 9, 1985

Related U.S. Application Data

[60] Division of Ser. No. 635,475, Jul. 30, 1984, Pat. No. 4,503,876, which is a continuation of Ser. No. 355,343, Mar. 8, 1982, abandoned.

[30] Foreign Application Priority Data

Mar. 11, 1981 [GB] United Kingdom ............... 8107693

[51] Int. Cl.⁴ .................................... G05D 16/10
[52] U.S. Cl. .................................... 137/101; 137/116
[58] Field of Search .................... 137/101, 116, 115

[56] References Cited

U.S. PATENT DOCUMENTS

| 3,165,113 | 1/1965 | Schultz | 137/101 |
| 3,444,880 | 5/1969 | Mercier | 137/116 |
| 3,575,192 | 4/1971 | MacDuff | 137/116 |
| 4,105,041 | 8/1978 | Axthammer | 137/116 |
| 4,378,816 | 4/1983 | Peiffer | 137/116 |

FOREIGN PATENT DOCUMENTS 2838115  3/1979  Fed. Rep. of Germany ...... 137/115

Primary Examiner—Martin P. Schwadron
Assistant Examiner—James R. Shay
Attorney, Agent, or Firm—Scrivener Clarke Scrivener and Johnson

[57] ABSTRACT

A control valve assembly incorporates a piston and a flow control valve which are both biassed in the same direction against pressure in an hydraulic accumulator by first and second respective springs. Accumulator pressure in a control chamber also acts to urge the flow control valve in the same direction as it is biassed by the second spring and pressure from a pump acts to bias the flow control valve in the opposite direction. A pilot dump valve controlling communication between the chamber and an outlet connection is normally biassed into a closed position by a third spring. The dump valve is adapted to open at a cut-out pressure to dump pressure from the chamber, and the cut-out pressure is determined by the area of the seating of the dump valve over which the pressure in the chamber acts, and the force in the third spring. A cut-in pressure at which the dump valve closes is determined by the area of the piston and the force in the first spring.

2 Claims, 1 Drawing Figure

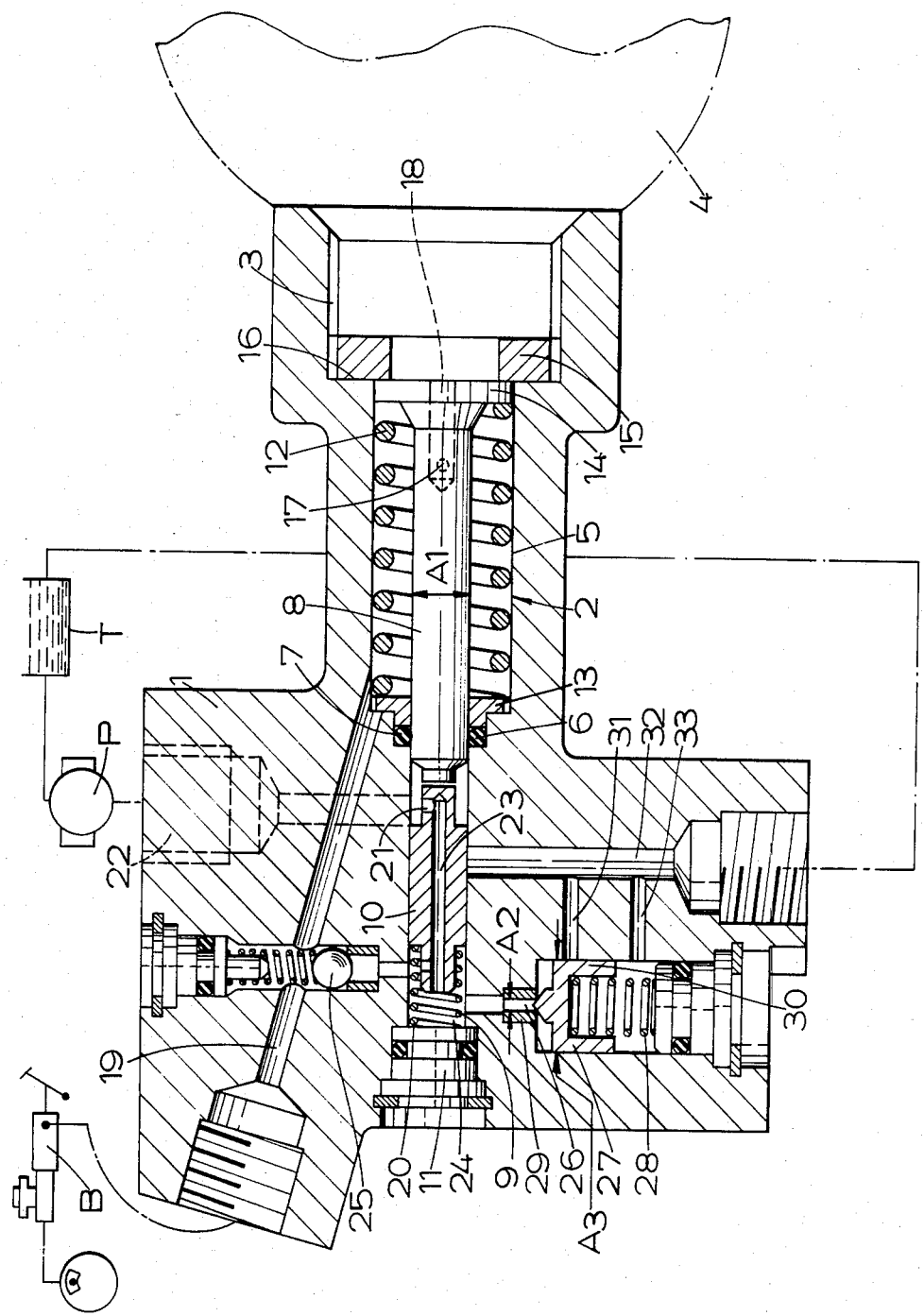

CONTROL VALVES FOR VEHICLE HYDRAULIC SYSTEMS

This application is a division of application Ser. No. 635,475, filed July 30, 1984, now Pat. No. 4,503,876, which is a continuation of application Ser. No. 355,343, filed Mar. 8, 1982, now abandoned.

This invention relates to control valve assemblies for vehicle hydraulic systems of the kind for limiting the pressure to which an hydraulic accumulator for supplying services can be charged from a high pressure pump.

Valve assemblies of this kind may comprise flow dividers arranged to divide the flow from the pump between steering gear connected to an outlet connection, and the accumulator, or unloader valves in which the outlet connection is simply connected to a tank for hydraulic fluid. Hereinafter such flow dividers or unloader valves will be referred to a valves "of the kind set forth".

Some known valve assemblies of the kind set forth incorporate valve means which senses pressure in the accumulator, requiring the provision of an elastomeric seal or a high precision ground spool which exhibit poor hysterisis at low temperatures.

In another known valve assembly of the kind set forth pilot valve means senses pump pressure and, when subjected to a predetermined pump pressure, is operative to dump such pump pressure to permit a one-way valve between the pump and the accumulator to close, thereby preventing any further increase in the pressure in the accumulator, with the accumulator pressure acting to open a further valve to divert flow from the pump to the tank.

According to our invention a control valve assembly of the kind set forth comprises a piston, a first spring biassing the piston in one direction in opposition to accumulator pressure, a flow control valve adapted to co-operate with the piston, a seacond spring biassing the flow control valve in the same direction as that in which the piston is biassed by the first spring, accumulator pressure in a control chamber acting on the flow control valve in the same direction as the second spring, and pump pressure acting on the flow control valve in the opposite direction, a pilot dump valve for controlling communication between the portion of the flow control valve which is subjected to accumulator pressure and an outlet connection, and a third spring for biassing the dump valve into a closed position to isolate the control chamber from the outlet connection, movement of the dump valve into an open position at a predetermined cut-out pressure dumping pressure from the control chamber to permit the flow control valve to be urged into an unloading position due to the pressure in the accumulator acting on the flow control valve through the piston and against the loading in the first spring and the second spring, reduction in accumulator pressure taking place until the force exerted on the piston by the first spring enables the piston to move in the opposite direction against the pressure at which the flow control valve again establishes communication between the pump and the accumulator.

It follows therefore that the cut-out pressure is determined by the area of the seating of the dump valve over which pressure in the control chamber acts and the force in the third spring, and the area of the piston and the force in the first spring determine the cut-in pressure.

By changing the value of the springs the cut-in/cut-out range can easily be changed, particularly since we can arrange to make an external adjustment in the load applied by the third spring.

When the valve assembly comprises a flow divider the outlet connection is connected to steering gear and flow through the flow control valve is determined by a restriction so that a substantial proportion of the flow from the pump is always supplied to the outlet connection.

When the valve assembly comprises an unloader valve no restriction is provided in the flow control valve and the flow control valve may be integral with the piston. The outlet connection is connected to the reservoir.

One embodiment of our invention is illustrated in the single FIGURE of the accompanying drawings which is a longitudinal section through a unloader valve.

The unloader valve illustrated in the drawing comprises a housing 1 provided with a longitudinally extending stepped bore 2 having a first threaded portion 3 of greatest diameter for connection to an hydraulic accumulator 4, a second portion 5 of intermediate diameter, a third portion 6 of a smaller diameter accommodating a seal 7 through which works a piston 8, and a further portion 9 of smallest diameter in which works a spool 10 defining a flow control valve, the outer end of that portion being closed by a plug 11.

A first strong spring 12 acts between a retainer 13 for the seal 7 and a head 14 at the end of the piston 8 which is remote from the spool 10 in order to urge the head towards a stop member 15 which is clamped by the accumulator 4 against a shoulder 16 at a step in diameter between the bore portions 3 and 5.

A radial port 17 and an axially extending passage 18 in the piston 8 provide communication between the accumulator 4 and the bore portion 5 which, in turn, is connected to services, for example a brake-actuating booster B or hydraulic suspension struts, through an inclined passage 19.

The spool 10 is urged by a second spring 20 into engagement with the adjacent end of the piston 8. The spool 10 is provided with a radial passage 21 which provides communication between a connection 22 to an hydraulic pump P and a communicating longitudinal passage 23 in the spool 10. The passage 23 leads to a control chamber 24 defined in the bore portion 9 between the plug 11 and the adjacent end of the spool 10 and in which the spring 20 is housed. The control chamber 24 leads to the passage 19 through a spring loaded one-way valve 25 and to a pilot dump valve 26.

The dump valve 26 comprises a valve member 27 of substantial diameter which is urged by a third spring 28 into engagement with a seating 29 of relatively small area and which is exposed to the control chamber 24. The valve member 27 has a skirt 30 which, when the head is in engagement with the seating 29, closes a passage 31. The passage 31 is connected to an outlet connection 32 leading from the bore portion 9 to a reservoir tank T. In addition, in that position, a further passage 33 connects the end of the head 27 remote from the seating 29 to the passage 32.

In the condition above we will designate the area of the piston 8 as $A_1$, the force in the spring 12 as $S_1$, the area of the seating 29 as $A_2$, the force in the spring 28 as $S_2$, the area of the valve member 27 as $A_3$, and the force in the spring 20 as $S_3$.

In the inoperative position shown in the drawing the piston 8 is held against the stop member 15 by the spring 12, and the spool 10 is held in engagement with the piston 8 by the spring 20 in which position it closes the passage 32 leading to the tank T.

To charge the system,, fluid under pressure from the pump P flows through the spool 10 to the accumulator through the control chamber 24, the one-way valve 25 and the passage 19.

As the accumulator pressure rises the pump pressure will rise accordingly but the pressure differential across the spool 10, caused by the spring 20, will remain constant.

As the pressure in the accumulator approaches a cut-out point defined by S2/A2 the pilot dump valve 9 opens due to the fluid at that pressure acting on the valve head 27 over the area $A_2$ and the control chamber 24 is exhausted to the tank T through the passage 31. This reduces the pump pressure immediately.

The accumulator pressure acting over $A_1$ then overcomes the force $S_1$ in the spring 12 and urges the piston 8 and the spool 10 relatively away from the stop member 15 until the spool 10 engages with the plug 11. In this position the pump P is in open unrestricted communications with the tank T through the passage 32, and the spool 10 isolates a passage from the bore portion 9 to the one-way valve 25 from the pump through the passage 23 in the spool 10.

The force $S_2$ in the spring 28 acts to urge the valve member 27 against its seating 29, once the outlet and pump pressures equalise, and fluid displaced by the area $A_3$ of the member 27 is passed through the seat 29 and spool 10 to the passage 32.

The use of the services reduces the pressure in the accumulator 4. When a cut-in pressure at a cut-in point is reached at S1/A1, the force $S_1$ in the spring 12 is sufficient to return the piston 8 to its original position, and the spring 20 moves the spool 10 in the same direction to permit the accumulator to be charged again as described above.

In a typical example we arrange that $S_1/A_1 = 1160$ p.s.i. (80 bar);

$S_2/A_2 = 1450$ p.s.i. (100 bar); and $A_3 = 100 A_2$.

In a modification the piston 8 and the spool 10 can be integral with each other or connected together against relative movement.

In the constructions described above the cut-in and cut-out pressures can be altered charging the values of the springs 12 and 28. It is particularly easy to change the spring 28 since it is readily accessible after removal of its external abutment. Alternatively the position of the external abutment can be altered to adjust the loading of the spring 28.

I claim:

1. An unloader valve assembly for vehicle hydraulic systems of the type incorporating an hydraulic high pressure pump, a reservoir and an hydraulic accumulator storing accumulator pressure for supplying services and adapted to be charged from said pump, said unloader valve assembly comprising a piston movable in first and second opposite directions, a first spring biassing said piston in said first direction in opposition to accumulator pressure in said accumulator, a flow control valve adapted to co-operate with said piston and movable in first and second opposite directions, a second spring biassing said flow control valve in said first direction corresponding to said first direction in which said piston is biassed by said first spring, means defining a control chamber supplied from said pump, pressure in said control chamber acting on said flow control valve in a direction corresponding to the direction in which said flow control valve is biassed by said second spring, and pump pressure acting on said flow control valve in the opposite said second direction, and on said piston in said first direction, an outlet for connection to said reservoir, a pilot dump valve movable between an open position and a closed position for controlling communication between said control chamber and said outlet, and a third spring for biassing said dump valve into said closed position to isolate said control chamber from said outlet, pressure in said control chamber acting on said dump valve in opposition to said third spring to urge it into open position, and means for determining a cut-out pressure for said accumulator comprising said third spring, and means for determining a cut-in pressure for said accumulator comprising said first spring, said accumulator being charged by said pump through passage means including a substantially unrestricted passage in said flow control valve, and said control chamber, said control chamber being exposed to accumulator pressure during charging of said accumulator, and at said cut-out pressure said dump valve opens in response to said control pressure to connect said control chamber to said outlet, such that said flow control valve and said piston move against said first and second springs, said flow control valve being moved into an unloading position, in which it is maintained by said accumulator pressure acting on said piston, said dump valve subsequently closing, and following reduction of said accumulator pressure due to operation of said services at said cut-in pressure, said first and second springs move said piston and said flow control valve in said first direction to establish communication between said accumulator and said pump.

2. An unloader valve assembly as claimed in claim 1, wherein said third spring acts solely on said dump valve.

* * * * *